United States Patent [19]  [11] 3,926,913
Jones et al.  [45] Dec. 16, 1975

[54] LOW TEMPERATURE CURING POLYIMIDES

[75] Inventors: Robert J. Jones, Hermosa Beach; Howard N. Cassey, Long Beach, both of Calif.

[73] Assignee: TRW Inc., Redondo Beach, Calif.

[22] Filed: Feb. 15, 1974

[21] Appl. No.: 443,058

[52] U.S. Cl. ..... 260/47 CP; 260/47 CB; 260/474 A; 260/49; 260/65; 260/77.5 R; 260/78 TF; 260/78 UA
[51] Int. Cl.² .......................................... C08G 73/10
[58] Field of Search . 260/47 CP, 47 CB, 65, 78 TF, 260/77.5 R, 78 UA, 474 A

[56] References Cited
UNITED STATES PATENTS

| | | | |
|---|---|---|---|
| 3,179,634 | 4/1965 | Edwards | 260/78 |
| 3,555,071 | 1/1971 | Rao et al. | 260/453 |
| 3,575,924 | 4/1971 | Bargain | 260/47 |

Primary Examiner—Lester L. Lee
Attorney, Agent, or Firm—Daniel T. Anderson; Alan D. Akers; Willie Krawitz

[57] ABSTRACT

A low temperature curing, linear polyimide is produced by substituting diaminostilbene not in excess of 50 mole percent for the primary diamine in the polyimide backbone chain, and upon curing in the presence of a free radical producing catalyst, and optionally, an ethylenically terminated cross-linking agent, a high performance, thermosetting polyimide is formed.

8 Claims, No Drawings

LOW TEMPERATURE CURING POLYIMIDES

The invention herein described was made in the course of or under a contract or subcontract thereunder with the Department of Defense.

BACKGROUND OF THE INVENTION

Polyimides are attractive for use where high performance polymers are required. Generally polyimides can withstand melting when exposed to temperatures of 500°C for extended periods of time. While many uses have been found for polyimides, their uses have been limited in many areas by their low elongation and by their high processing temperatures. For example, U.S. Pat. No. 3,179,634 teaches a polyimide which has an elongation of 22% which is imidized at a temperature of 325°C, and U.S. Pat. No. 3,533,997 teaches a cross-linked polyimide having an elongation of 5.2% which is cured at temperatures ranging from 300°C to 400°C.

U.S. Pat. No. 3,575,924 teaches cross-linked polyimides which are cured between 80°C and 350°C in the presence of free radical catalyst, such as a peroxide. Elongation at break for one of the cross-linked polyimides produced according to the teaching of the patent is 8%.

SUMMARY OF THE INVENTION

Low temperature curing, linear polyimides are produced by reacting a primary diamine or a diisocyanate with a dianhydride or a tetracarboxylic acid followed by curing of the resulting polyimide in the presence of a free radical producing catalyst. The primary diamine must be diaminostilbene not in excess of 50 mole percent. Optionally, a cross-linking agent in the amount of up to equal molar amounts with the diaminostilbene may be included. The cross-linking agent must have an ethylenically unsaturated structure in the terminal position on either end of the compound.

Ideally, the polyimide structure may be represented as follows:

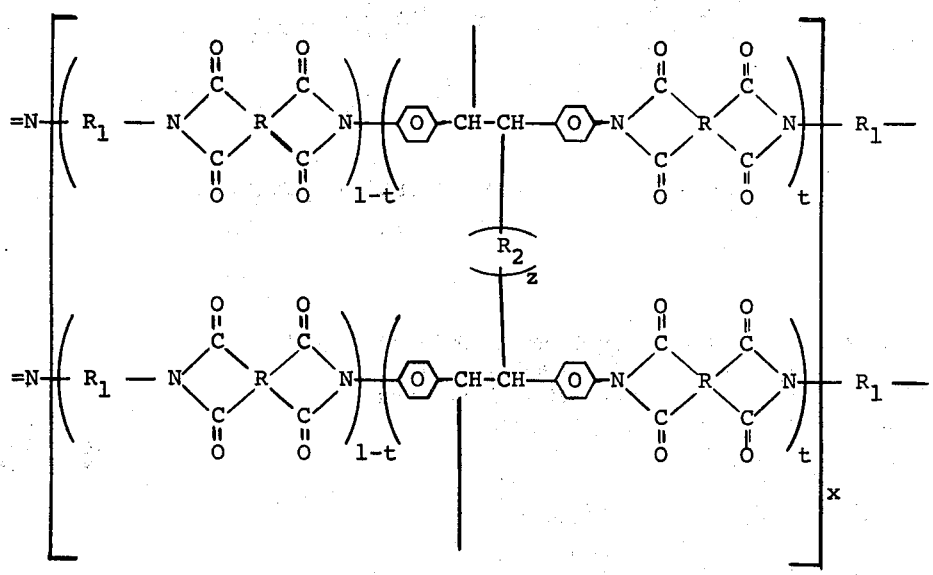

wherein R is a tetrafunctional radical selected from the group consisting of

and an alkdilydiene ranging from $C_2$ to $C_8$ wherein $R_3$ is a difunctional radical selected from the group consisting of —$SO_2$—, —O—, —S—, —CO—, and

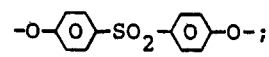

$R_1$ is a difunctional radical selected from the group consisting of

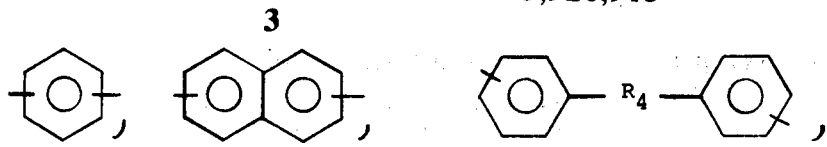
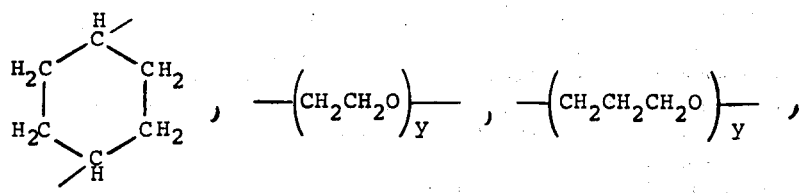
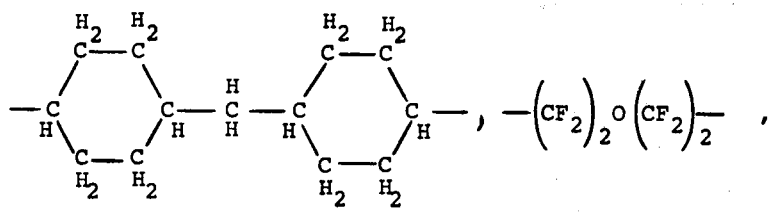
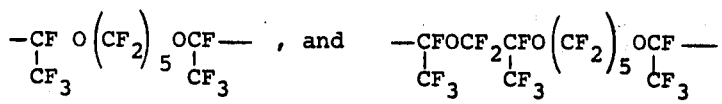
wherein $R_4$ is a difunctional radical selected from the group consisting of —O—, —S—, —SO$_2$—, —CO—, —CH$_2$—, —C$_2$H$_4$—, and —C$_3$H$_6$—; $R_2$ is a difunctional radical selected from the group consisting of
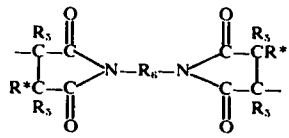
and
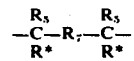
wherein $R_6$ is selected from the group consisting of
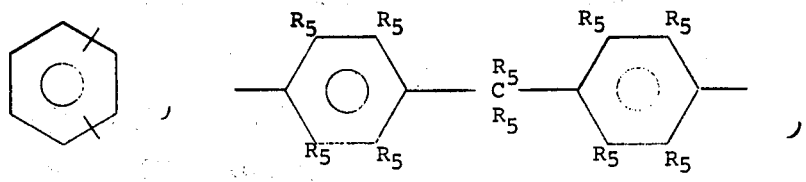
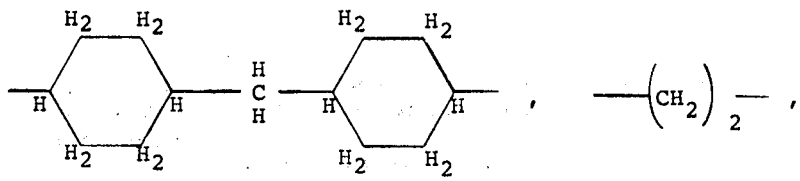
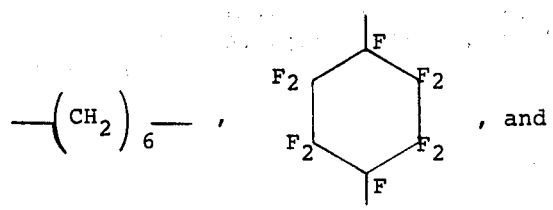

wherein R₅ is a monofunctional radical selected from the group consisting of hydrogen and fluorine; R* is a radical from the peroxide; and R₇ is a difunctional radical selected from the group consisting of

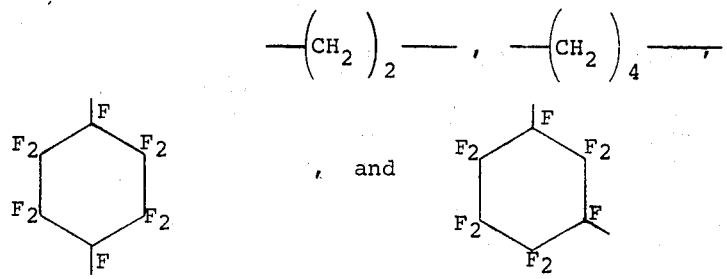

$y$ is an integer from 1 to 150; Z is a fractional amount from 0 to and including $t$; $t$ is a fractional amount up to one half; and $x$ is an integer from 8 to 200.

The procedure for making the polyimide comprises reacting the dianhydride or tetraacid, the diaminostilbene and the primary diamine to produce a polyimide-acid. If a cross-linking agent is used, it may be blended into the initial mix or subsequently included when the free radical catalyst is added. After the free radical catalyst has been added the mixture is heated to imidize the polyimide-acid and simultaneously or subsequently activate the free-radical producing catalyst and the cross-linking agent to produce the cured cross-linked polyimide. Polyimides according to this invention may be used as elastomers, coating, films, adhesives, and composites.

DESCRIPTION OF THE PREFERRED EMBODIMENTS

Low temperature curing polyimides are produced by reacting a tetracarboxylic acid or a dianhydride with diaminostilbene and a primary diamine or diisocyanate and curing the mixture in the presence of a free radical producing catalyst. The diaminostilbene may be present in any amount but not in excess of 50 mole percent of the total amount of primary diamine present, an optionally, an ethylenically terminated cross-linking agent may be added in amount equimolar with the diaminostilbene present.

Examples of the dianhydrides which have been found to be suitable in the practice of this invention, may be selected from the following list which is representative of a few of the dianhydrides:

pyromellitic dianhydride
benzophenone tetracarboxylic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl)propane dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7,-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride
bis(3,4-dicarboxyphenoxyphenyl)sulfone dianhydride It is to be understood that the corresponding tetraacids of the above-listed dianhydrides are equally suitable.

Alternatively, the tetraacid compounds may be illustrated by the following structural formula:

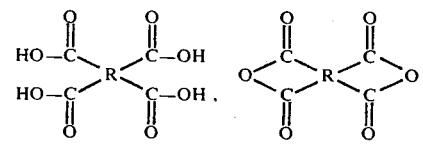

wherein R is a tetrafunctional radical selected from the group consisting of

and an alkdilydiene ranging from $C_2$ to $C_8$, wherein $R_3$ is a difunctional radical selected from the group consisting of —O—, —S—, —SO$_2$—, —CO—, —CH$_2$—, —C$_2$H$_4$—, —C$_3$H$_6$—, and

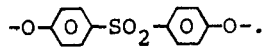

All of the polyimide formulations in this invention require the presence of some diaminostilbene. Diaminostilbene provides the cross-linking site for the polyimide backbone chain, and should be present in amounts not over 50 mole percent of the total amount of the primary diamines present.

Primary diamines used in this invention are present in an equal molar amount with the dianhydride. As stated above, not over 50 mole percent, and preferably 10% to 20 mole percent, of the diamine should be the particular diamine, diaminostilbene. The remaining primary diamines may be selected from any of the following:

para-phenylene diamine
meta-phenylene diamine
4,4'-diamino-diphenyl propane
4,4'-diamino-diphenyl methane
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis-(beta-amino-t-butyl)toluene
bis-(para-beta-amino-t-butyl-phenyl)ether
bis-(para-beta-methyl-delta-amino-pentyl)benzene
bis-para-(1,1-dimethyl-5-amino-pentyl)benzene
1-isopropyl-2,4-metaphenylene diamine
m-xylylene diamine
hexamethylene diamine
heptamethylene diamine
octamethylene diamine
nonamethylene diamine
decamethylene diamine
diamino-propyl tetramethylene diamine
3-methylheptamethylene diamine
4,4-dimethylheptamethylene diamine
2,11-diamino-dodecane
1,2-bis-(3-amino-propoxy)ethane
benzidine
2,2-dimethyl propylene diamine
3-methoxy-hexamethylene diamine
3,3'-dimethyl benzidine
2,5-dimethylhexamethylene diamine
2,5-dimethylheptamethylene diamine
5-methyl-nonamethylene diamine
2,17-diamino-eicosadecane
1,4-diamino-cyclohexane
1,10-diamino-1,10-dimethyl decane
1,12-diamino-octadecane Structurally, the primary diamines may be illustrated as follows:

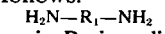

wherein $R_1$ is a difunctional radical selected from the group consisting of

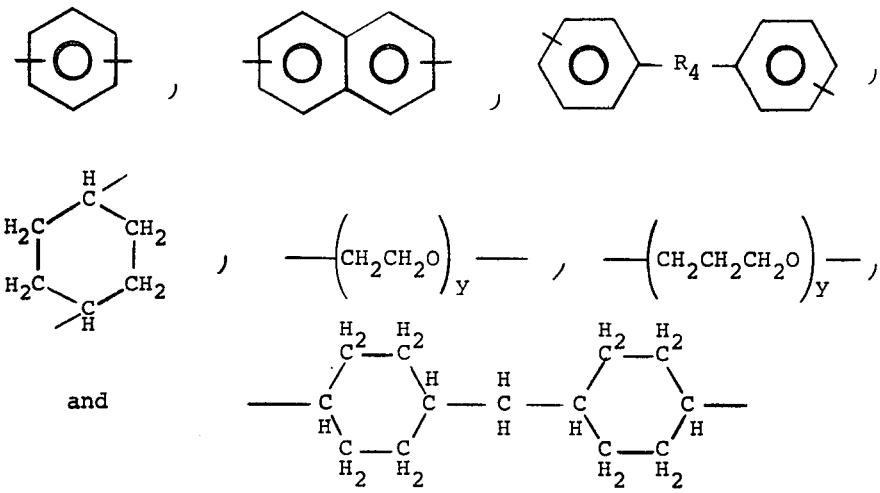

wherein $R_4$ is a difunctional radical selected from the group consisting of —O—, —S—, —SO$_2$—, —CO—, —CH$_2$—, —C$_2$H$_4$—, and —C$_3$H$_6$—; and $y$ is an integer from 1 to 150.

Alternatively, diisocyanates may be used in place of or in conjunction with the primary diamines. When diisocyanates are used, not over 50 mole percent, and preferably 10%–20 mole percent, of the diaminostilbene is substituted for the diisocyanate. Diisocyanates suitable for use in the invention have the structural formula:

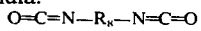

wherein $R_8$ is a difunctional radical selected from the group consisting of

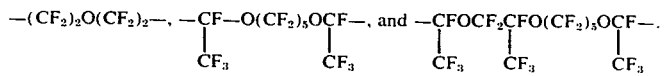

For further modification of the polyimides, a cross-linking agent can be included. Cross-linking agents may be selected from a wide variety of materials, however, all of the cross-linking agents must have an ethylenically unsaturated group at the terminal positions on either end of the molecule. Thus, olefins having unsaturated bonds in the first and last position, bis(male)imides and divinyl substituted aromatics, are suitable for use as cross-linking agents in this invention. A list of specific cross-linking agents which are suitable are:

bis(4-maleimidophenyl) methane
bis(4-tetrahydrophthalimidophenyl) methane
bis[4-(difluoromaleimido)phenyl] methane
bis[4-(difluoromaleimido)-2,3,5,6-tetrafluorophenyl] difluoromethane
1,3-dimaleimidobenzene
1,4-dimaleimidobenzene
perfluoro-1,3-butadiene
perfluoro-1,5-hexadiene
perfluoro-1,7-octadiene
1,3-divinylbenzene
1,4-divinylbenzene
perfluoro-1,3-divinylbenzene
perfluoro-1,4-divinylbenzene
1,2-dimaleimidoethane
1,6-dimaleimidohexane Because the cross-linking agent is believed to react at the ethylenic bond of the diaminostilbene, the amount of the cross-linking agent may vary in any amount from 0 up to an equal molar amount of the diaminostilbene present. Of course, if no cross-linking agent is present or if an amount of cross-linking agent present is less than the amount of the diaminostilbene present, then there will be cross-linking between the diaminostilbene present in the adjacent linear chains. Therefore, by regulating the amount of the diaminostilbene present and the presence and amount of a cross-linking agent, a broad range of polyimide properties can be obtained. For example, a highly aromatic polyimide having a high percentage of diaminostilbene will produce a tough, stiff thermosetting polyimide; whereas, a polyimide having a large number of long alphatic segments and a large number of long chain cross-linking agents will produce a highly elastomeric or compliant polyimide.

Free radical producing catalysts are used to assist in the cross-linking reaction. Peroxides are the preferred free radical catalysts and can be used in any amount up to 100% excess of the stoichiometric amount based on the moles of diaminostilbene present. In addition to the peroxide catalysts, other catalysts effection reaction of ethylenic unsaturation may be used. The following list of compounds is representative of a few of the free radical catalysts which are suitable for use in this invention. Perfluoroacetyl peroxide, benzoyl peroxide, perbenzoic acid, bisazoisobutyro nitrile, acetyl peroxide, t-butyl peroxide, and 2,5-dimethyl-2,5-bis(t-butyl peroxy) hexane.

Polyimides are prepared by the reaction of an organic dianhydride or tetraacid, diaminostilbene, and a diisocyanate or primary diamine which is subsequently cured in the presence of a free radical catalyst. The free radical catalyst can be added during the initial blending of the components, or it may be added after the mixture is fully imidized. In order to add the catalyst after the mixture is fully imidized, it is preferable to use a component which will render the imide subject to easy dissolution, e.g. a sulfone, so that the catalyst can be blended in a homogeneous manner throughout the imide.

If the catalyst is added to the components initially, care must be exercised in heating the mixture during imidization if it is desired to avoid cross-linking at that particular time. Of course, the cross-linking reaction and imidization may be carried out simultaneously, however, this is not always desirable. Where separate reactions are desired, a catalyst having a higher activation temperature than the temperature of imidization is required. Thus, the mixture may be heated to a lower temperature range to effect the imidization, and subsequently upon completion of the imidization, the imides may be raised to a higher temperature to activate the catalyst and effect the cross-linking cure.

Where a cross-linking agent is employed, it may be added either to the initial blend or subsequently after imidization. Essentially, the same considerations apply to the cross-linking agent as applied to the catalyst, i.e., where the cross-linking agent is added after imidization, the imide must be soluble so as to permit homogeneous blending throughout the imide.

The formation of the polyimide may be illustrated ideally as follows:

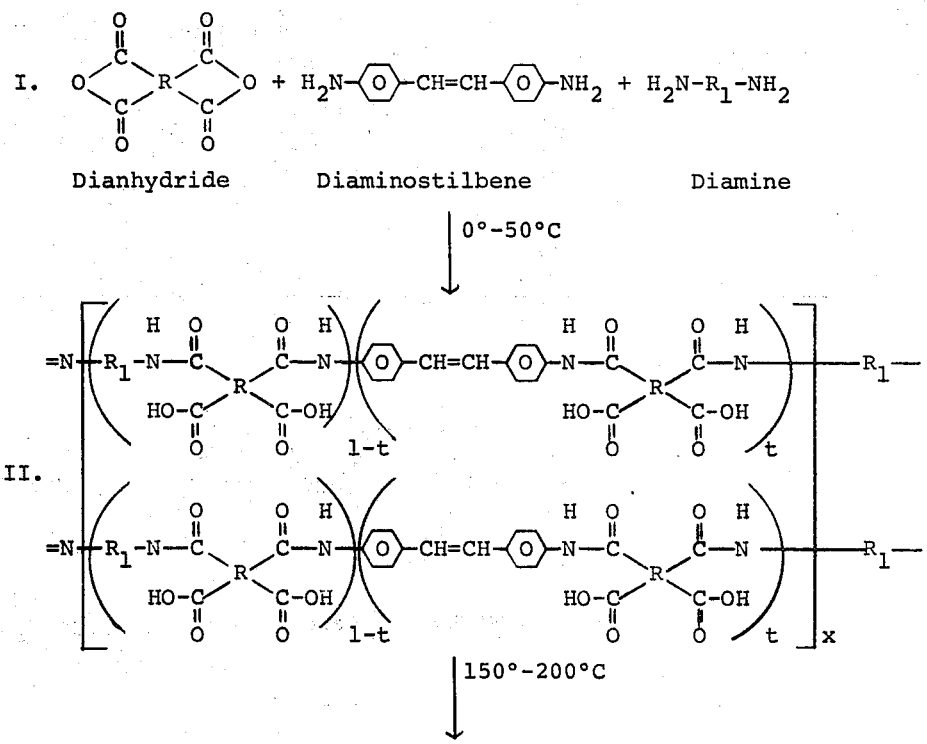

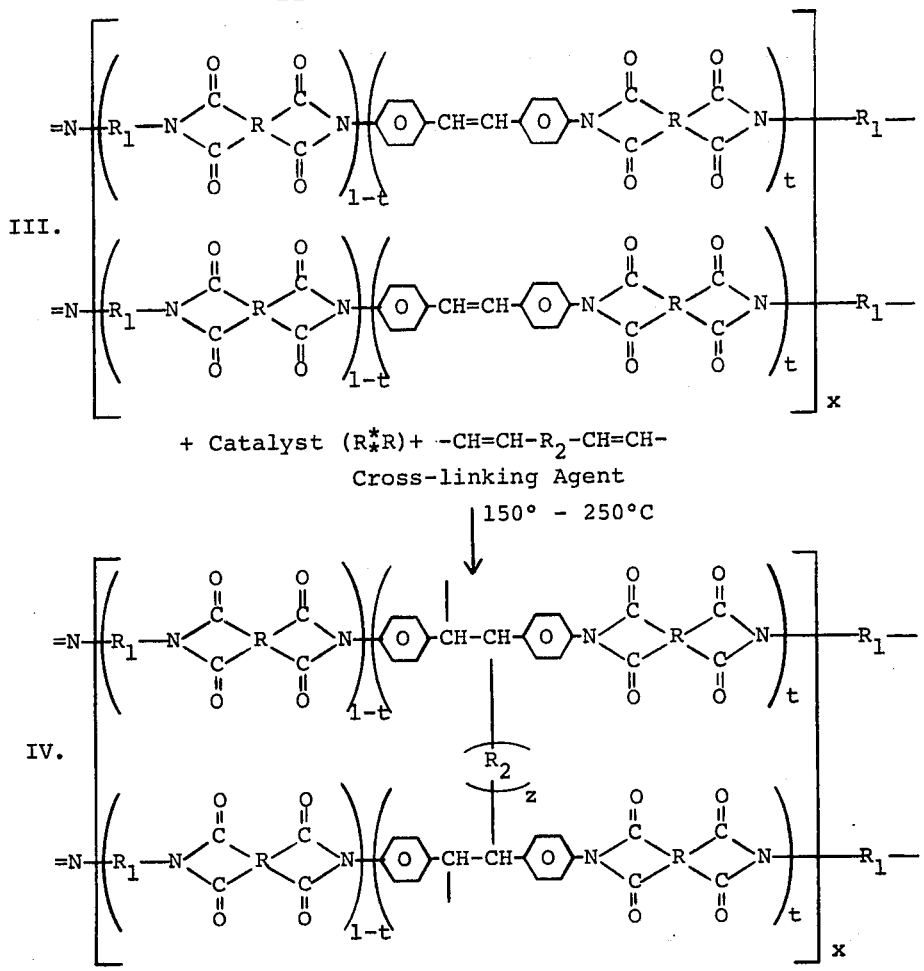
+ Catalyst $(R_*^*R)$ + -CH=CH-R$_2$-CH=CH-
Cross-linking Agent
$\downarrow$ 150° - 250°C
wherein R is a tetrafunctional radical selected from the group consisting of
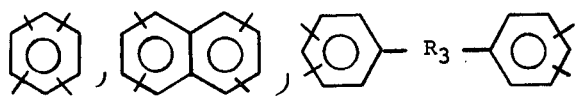
and an alkdiyldiene ranging from $C_2$ to $C_8$ wherein $R_3$ is a difunctional radical selected from the group consisting of —SO$_2$—, —O—, —S—, —CO—, and
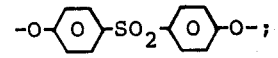
$R_1$ is a difunctional radical selected from the group consisting of
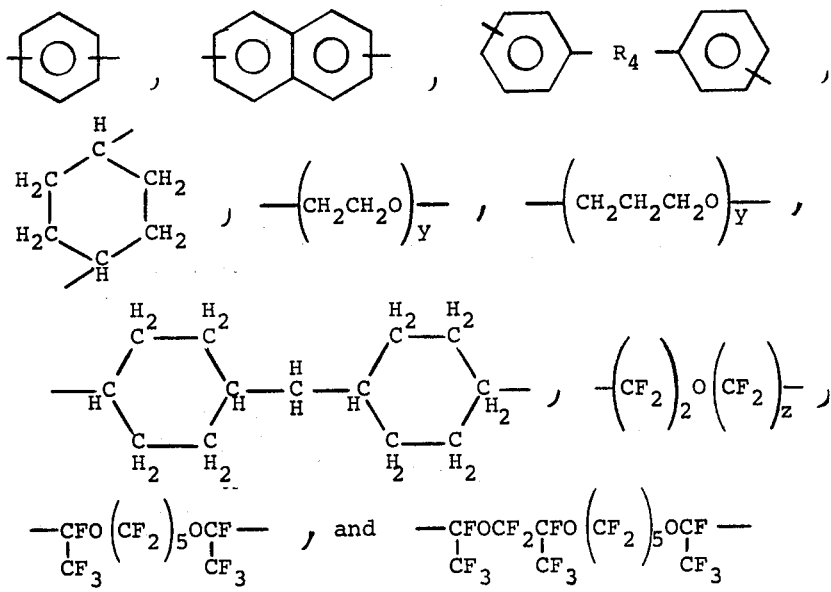

wherein $R_4$ is a difunctional radical selected from the group consisting of —O—, —S—, —SO$_2$—, —CO—, —CH$_2$—, —C$_2$H$_4$—, and —C$_3$H$_6$—; $R_2$ is a difunctional radical selected from the group consisting of

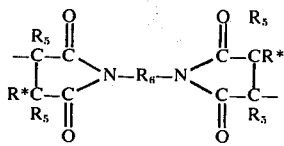

and

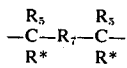

wherein $R_6$ is selected from the group consisting of

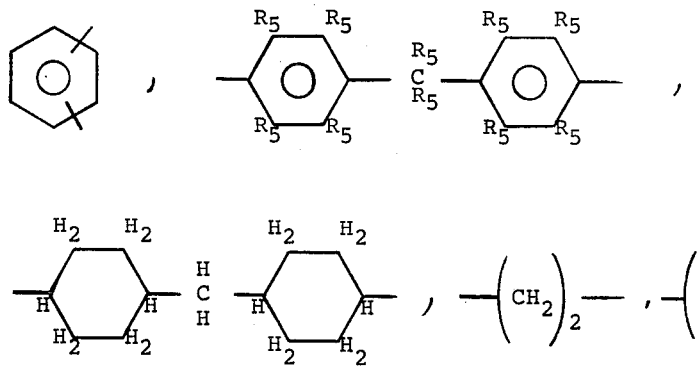

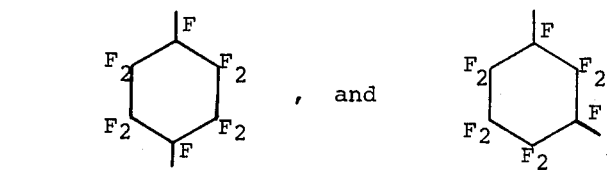

wherein $R_5$ is a monofunctional radical selected from the group consisting of hydrogen and fluorine; $R^*$ is a radical from the peroxide; and $R_7$ is a difunctional radical selected from the group consisting of

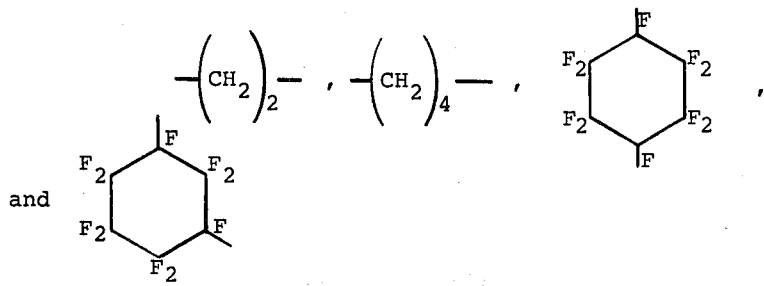

Y is an integer from 1 to 150; Z is a fractional amount from 0 to and including $t$; $t$ is a fractional amount up to one half; and $x$ is an integer from 8 to 200.

As previously discussed, the addition of the catalyst and cross-linking agent may be made in either of steps I, II, or III, depending upon the type of catalyst used or the type of imide being made.

The invention will be more clearly understood by referring to the examples which follow. These examples are intended to be illustrative only and should not be construed to limit the invention in any way.

EXAMPLE I

Exactly 3.867 g (0.0195 mole) of methylenedianiline, 0.630 g (0.0030 mole) of diaminostilbene and 7.860 g (0.0075 mole) of 1000 mol. wt. poly(oxoethylene) diamine were dissolved in 22.5 ml warm dimethyl formamide and placed in a micro blender. Stirring was initiated, then 16.276 gm (0.0300 mole) of predissolved bis(3,4-dicarboxyphenoxyphenyl) sulfone dianhydride in 45 ml dimethyl formamide was slowly added to the micro blender. The reaction mixture was cooled by dry ice during and after the dianhydride addition, and was stirred for an additional five-minute period at fast speed after complete addition of the dianhydride. The resultant polyamic-acid varnish was then placed in an aluminum foil cup, dried and imidized under vacuum at 350°F overnight. Exactly 7.70 gm of the polyimide varnish (0.000166 mole diaminostilbene present) at 20% by weight solids in dimethyl formamide was added to 0.030 gm (0.000083 mole) of bis(4,4'-diphenylmethane) maleimide and 0.6% by weight of 2,5-dimethyl-2,5-bis(t-butylperoxy)hexane mixed thoroughly, and cast onto an aluminum sheet with a Gardner knife, and dried under vacuum at 350°F overnight. The aluminum sheet was dissolved by dilute hydrochloric acid to produce the fully cured cross-linked polyimide, which was insoluble in boiling DMF for more than six hours.

EXAMPLE II

To exactly 8.67 gm (0.000182 mole diaminostilbene present) of the same polyimide varnish was added 0.033 gm (0.000091 mole) of bis(4,4'-diphenylmethane) maleimide and 1.2% by weight of 2,5-dimethyl-2,5-bis(t-butylperoxy)hexane mixed thoroughly, cast onto an aluminum sheet with a Gardner knife, and dried under vacuum at 350°F overnight. The aluminum was dissolved by dilute hydrochloric acid to produce the fully cured cross-linked polyimide, which was insoluble in boiling DMF for more than six hours.

The following table is a summary of the property data on cured film samples produced in Examples I and II above.

TABLE II

INITIAL SCREENING RESULTS OBTAINED ON FULLY AROMATIC CURED POLYMER

| Solubility After Cure[b] | | Film Appearance | Initial Thermo-oxidative Stability[b] (°F in air) |
|---|---|---|---|
| Dimethylacetamide | $H_2SO_4$ | | |
| No | No | Tough, Cresable, Light yellow in color | >600 |

[a]Positive vulcanization was deemed present if sample remained insoluble after a> two-hour boil period in dimethylformamide, and after a> eight-hour period in $H_2SO_4$ at room temperature.
[b]Determined on film samples employing a scan rate of 3°C/min and 100 ml air flow; temperatures reported as first weight loss detected in TGA curve.

TABLE I

SUMMARY OF VULCANIZATION EXPERIMENTATION AND PROPERTY DATA ON CURED FILM SAMPLES

| Linear Gumstock Formulation | Quantity of[a] BI-2 Cross-linking Agents Employed (w/w %) | Quantity of[b] Catalyst Employed (w/w %) | Solubility[c] in Dimethylformamide After Cure | Tensile Properties[d] Strength (Ksi) | Elongation (%) | Initial[e] Thermal Stability (°F) | Recoverable Elongation (%)[f] |
|---|---|---|---|---|---|---|---|
| Example I | 0.38 | 0.6 | No | 6900 | 110 | 615 | 66 |
| Example II | 0.38 | 1.2 | No | 6700 | 75 | 620 | 67 |

[a]Quantity of bis(imide) employed corresponds to equal molar amount of unsaturation to that imparted by diaminostilbene.
[b]Quantity corresponds to an equal molar basis to unsaturation imparted by diaminostilbene.
[c]Positive vulcanization was deemed present if sample remained insoluble in dimethylformamide after a two-hour boil period.
[d]Average of triplicate breaks determined on thin films by Instron analysis employing a crosshead speed of 0.2-in/min.
[e]Determined in film samples employing a scan rate of 3°C/min and 100 ml/min $N_2$ flow; temperatures reported as first weight loss detected in TGA curve.
[f]Measured on tensile specimens fifteen minutes after elongating to break.

EXAMPLE III

To a dry 100 ml, three-necked flask, equipped with a mechanical stirrer and a nitrogen inlet, was added a 1.904 gm (0.0096 mole) methylene dianiline, 0.084 gm (0.0004 mole) diaminostilbene and 19 ml of DMAC. Stirring was initiated and the diamine solution was cooled to 20°C by immersing the flask in an ice-water bath. Bis(3,4-dicarboxyphenoxyphenyl) sulfone dianhydride (5.425 gm, 0.01 mole) was then added over a 10-minute period to the flask, followed by an additional 10 ml of dimethylacetamide. The mixture was stirred for two hours and then poured into an aluminum cup and imidized under vacuum at 180°C for 18 hours. One gram (containing 0.0000284 mole of diaminostilbene) of the imidized polymer was placed in a 20 ml round-bottom flask and dissolved in 5 gm of dimethylacetamide by stirring at room temperature for 20 minutes. To the solution was added 0.0051 gm (0.0000142 mole) bis(4,4'-diphenylmethane) maleimide and 0.0165 gm 2,5-dimethyl-2,5-bis(t-butylperoxy)hexane. The well mixed solution was cast onto a glass plate with a Gardner knife and cured at 180°C for 18 hours. The cured film was easily removed from the glass plate by soaking in warm water. After cure, the polymer was found to be insoluble in concentrated sulphuric acid at room temperature and in boiling dimethylacetamide.

The following Table II gives results obtained on the polymer produced in Example III.

We claim:
1. A process for the preparation of a low temperature curing polyimide comprising:
   A. blending an organic compound selected from the group consisting of dianhydride and tetraacid and a free radical catalyst with diaminostilbene not in excess of 50 mole percent and the remainder a nitrogen compound selected from the group consisting of organic diisocyanate and organic primary diamines whereby a mixture of an amide-acid with the catalyst dispersed therethrough is formed;
   B. subsequently heating the mixture in a temperature range of from 150° to 200°C to imidize said amide-acid fully; and
   C. heating said imide-catalyst in a temperature range of from 150° to 250°C to activate said catalyst whereby a compliant polyimide is formed.

2. A process according to claim 1 wherein said catalyst is added after said amide-acid is formed.

3. A process according to claim 1 wherein a cross-linking agent having terminally positioned ethylene substituents selected from the group consisting of olefins, bis(male)-imides, divinylbenzene, and fluoro-substituted divinylbenzene is blended into the initial mixture in amounts up to equal molar with said diaminostilbene.

4. A process according to claim 1 wherein said organic compound has the structural formula selected from the group consisting of $$\text{HO-}\underset{\underset{\text{HO-C}}{\|}}{\overset{\overset{O}{\|}}{C}}\text{-R-}\underset{\underset{\|}{C-OH}}{\overset{\overset{O}{\|}}{C-OH}} \quad \text{and} \quad O\underset{\underset{\|}{C}}{\overset{\overset{O}{\|}}{C}}\text{-R-}\underset{\underset{\|}{C}}{\overset{\overset{O}{\|}}{C}}O$$

wherein R is a tetrafunctional radical selected from the group consisting of

[structures: benzene tetra-substituted, naphthalene tetra-substituted, biphenyl with R₃ bridge, tetra-substituted]

and an alkdilydiene ranging from $C_2$ to $C_8$ wherein $R_3$ is a difunctional radical selected from the group consisting of —O—, —S—, —SO$_2$—, —CO—, —CH$_2$—, —C$_2$H$_4$—, —C$_3$H$_6$—, and $-O-\underset{}{\bigcirc}-SO_2-\underset{}{\bigcirc}-O-.$ 5. A process according to claim 1 wherein said organic primary diamine has the structural formula of $H_2N - R_1 - NH_2$ wherein $R_1$ is a difunctional radical selected from the group consisting of

[structures: phenylene, naphthylene, biphenyl with R₄ bridge]

[cyclohexane structure], $-(CH_2CH_2O)_y-$, $-(CH_2CH_2CH_2O)_y-$, and [dicyclohexylmethane structure]

wherein $R_4$ is a difunctional radical selected from the group consisting of —O—, —S—, —SO$_2$—, —CO—, —CH$_2$—, —C$_2$H$_4$—, and —C$_3$H$_6$—; and $y$ is an integer from 1 to 150.

6. A process according to claim 1 wherein said organic diisocyanate has the structural formula $O=C=N-R_8-N=C=O$ wherein $R_8$ is a difunctional radical selected from the group consisting of $-(CF_2)_2O(CF_2)_2-, -\underset{\underset{CF_3}{|}}{C}F-O(CF_2)_5O\underset{\underset{CF_3}{|}}{C}F-,$ and $-\underset{\underset{CF_3}{|}}{C}FOCF_2\underset{\underset{CF_3}{|}}{C}FO(CF_2)_5O\underset{\underset{CF_3}{|}}{C}F-.$ 7. A process according to claim 1 wherein said free radical catalyst is an organic peroxide.

8. A process according to claim 1 wherein said diaminostilbene is present in amounts ranging from 10 to 20 mole percent.

* * * * *